United States Patent
Takada

(10) Patent No.: US 6,961,252 B2
(45) Date of Patent: Nov. 1, 2005

(54) SWITCHING POWER SUPPLY

(75) Inventor: Koji Takada, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 29 days.

(21) Appl. No.: 10/813,083

(22) Filed: Mar. 31, 2004

(65) Prior Publication Data
US 2004/0208021 A1   Oct. 21, 2004

(30) Foreign Application Priority Data
Apr. 10, 2003 (JP) .............................. 2003-106180

(51) Int. Cl.[7] .......................................... H02M 3/335
(52) U.S. Cl. ......................................... 363/23; 363/22
(58) Field of Search .................. 363/16, 23, 22, 363/133

(56) References Cited

U.S. PATENT DOCUMENTS

| 5,331,534 A | * | 7/1994 | Suzuki et al. ................ 363/20 |
| 5,673,184 A | | 9/1997 | Rilly et al. |
| 5,790,389 A | | 8/1998 | Hua |
| 6,005,780 A | | 12/1999 | Hua |

FOREIGN PATENT DOCUMENTS

| JP | 8-182332 | 7/1996 |
| JP | 8-186981 | 7/1996 |
| JP | 2751961 | 2/1998 |
| JP | 3367539 | 11/2002 |

* cited by examiner

Primary Examiner—Shawn Riley
(74) Attorney, Agent, or Firm—Westerman, Hattori, Daniels & Adrian, LLP

(57) ABSTRACT

An AC/DC switching power supply that realizes a high power factor and has little voltage stress on a smoothing capacitor is provided. Also a switching power supply that has little voltage stress on a switch and is suitable for reduction in loss and miniaturization is provided. A switching power supply comprises a rectifying circuit for rectifying an AC voltage, a smoothing capacitor for smoothing an output of the rectifying circuit, a series switch circuit formed by a first switch and a second switch connected between two electrodes of the smoothing capacitor, a transformer for inducing a voltage to be an output at a secondary winding as the first switch is turned on/off and the second switch is turned on/off in a complementary manner with the first switch, and a series circuit formed by a primary winding of the transformer connected between a connection point of the first switch and the second switch and one terminal of the smoothing capacitor, and a resonance capacitor, wherein a first magnetic element connected between a positive electrode obtained by rectifying the AC voltage and an intermediate tap of the primary winding is provided, the resonance capacitor is connected to the connection point of the first switch and the second switch, and the primary winding is connected to the positive electrode of the smoothing capacitor.

5 Claims, 17 Drawing Sheets

SWITCHING POWER SUPPLY

BACKGROUND OF THE INVENTION

1. Field of the Invention

This invention relates to a switching power supply that inputs an AC voltage and converts it to a predetermined output, and that particularly converts power at a high power factor and with high efficiency.

2. Description of Related Art

A conventional switching power supply has a DC input power source and it is difficult to realize a high power factor (see, for example, Patent Literature 1). This example will now be described in detail with reference to FIG. 1. FIG. 1 is a structural view showing a conventional switching power supply.

In FIG. 1, a common potential COM and a common potential GND are used as a common potential of the switching power supply. An AC voltage Vac is connected to a rectifying circuit DB1. The rectifying circuit DB1 rectifies the AC voltage Vac.

The rectifying circuit DB1 is connected to a smoothing capacitor C1. The smoothing capacitor C1 smoothes an output of the rectifying circuit DB1 and generates a voltage VC1 to be a DC input power source.

A series switch circuit formed by a first switch Q1 and a second switch Q2 is provided between the two electrodes of the smoothing capacitor C1. Moreover, a series circuit formed by an inductor L41, a primary winding N41 of a transformer T41 and a resonance capacitor C11 is provided between a connection point between the first switch Q1 and the second switch Q2, and one terminal (negative electrode) of the smoothing capacitor C1.

A secondary winding N42 and a secondary winding N43 of the transformer T41 are connected to a diode D1 and a diode D2, respectively, then connected to an inductor L3 and a capacitor C3, and then connected to a load Load.

As the first switch Q1 is turned on/off and the second switch Q2 is turned on/off in a complementary manner with the first switch Q1, voltages to be an output are induced at the secondary winding N42 and the secondary winding N43 of the transformer T41. The voltages are rectified by the diodes D1 and the diode D2, then smoothed by the inductor L3 and the capacitor C3 and thus become an output voltage Vout to supply power to the load Load.

In this manner, in the conventional example of FIG. 1, the DC input power source is generated from the AC voltage Vac and the DV input power source is converted to the output voltage Vout.

As an input current Iin, a pulse-like current flows.

Moreover, a conventional switching power supply has a reverse-current blocking diode Da between a smoothing capacitor C1 and a switching regulator circuit (first switch Q1, second switch Q2, resonance capacitor C2, transformer T1, diode D11, diode D12 and capacitor C3) (see, for example, Patent Literature 2).

This example will now be described in detail with reference to FIG. 2. FIG. 2 is a structural view showing another conventional switching power supply. The same elements as those in the conventional example of FIG. 1 are denoted by the same symbols and numerals and will not be described further in detail.

In the conventional example of FIG. 2, the positive electrode of the smoothing capacitor C1 is connected to the anode of the reverse-current blocking diode Da. A series switch circuit formed by the first switch Q1 and the second switch Q2 is connected to the cathode of the reverse-current blocking diode Da. One end of the resonance capacitor C2 is connected to a connection point between the first switch Q1 and the second switch Q2.

One end of a primary winding N1a of the transformer T1 is connected to the cathode of the reverse-current blocking diode Da and the drain of the second switch Q2. That is, the one end of the primary winding N1a of the transformer T1 is not directly connected to the positive electrode of the smoothing capacitor C1.

The other end of the resonance capacitor C2 is connected to one end of a primary winding N1b of the transformer T1.

The other end of the primary winding N1a is connected to the other end of the primary winding N1b.

A secondary winding N2 and a secondary winding N3 of the transformer T1 are connected to the diode D11 and the diode D12, respectively, and then connected to the capacitor C3 and a load Load.

As the first switch Q1 is turned on/off and the second switch Q2 is turned on/off in a complementary manner with the first switch Q1, voltages to be an output are induced at the secondary winding N2 and the secondary winding N3 of the transformer T1. The voltages are rectified by the diode D11 and the diode D12, then smoothed by the capacitor C3 and become an output voltage Vout to supply power to the load Load.

That is, the first switch Q1, the second switch Q2, the resonance capacitor C2, the transformer T1, the diode D11, the diode D12 and the capacitor C3 form the switching regulator circuit (first switch Q1, second switch Q2, resonance capacitor C2, transformer T1, diode D11, diode D12 and capacitor C3).

In this conventional example of FIG. 2, an AC voltage Vac is converted to the output voltage Vout. A harmonic component of an input current Iin is restrained.

FIG. 3 is a structural view showing still another conventional switching power supply. The same elements as those in the conventional example of FIG. 1 and the conventional example of FIG. 2 are denoted by the same symbols and numerals and will not be described further in detail.

In the conventional example of FIG. 3, one end of a resonance capacitor C11 is connected to the negative electrode of a smoothing capacitor C1, as in the conventional example of FIG. 1.

One end of a primary winding N41 of a transformer T41 is connected to a connection point between a first switch Q1 and a second switch Q2, as in the conventional example of FIG. 1.

Moreover, the other end of the resonance capacitor C11 is connected to the other end of the primary winding N41.

In this conventional example of FIG. 3, an AC voltage Vac is converted to an output voltage Vout, as in the conventional example of FIG. 1 and the conventional example of FIG. 2.

A harmonic component of an input current Iin is restrained.

Patent Literature 1: Japanese Patent No. 2,751,961, Specification

Patent Literature 2: Japanese Patent No. 3,367,539, Specification

Patent Literature 3: JP-A-8-182332

Patent Literature 4: JP-A-8-186891

Patent Literature 5: U.S. Pat. No. 5,673,184, Specification

Patent Literature 6: U.S. Pat. No. 5,790,389, Specification

Patent Literature 7: U.S. Pat. No. 6,005,780, Specification

However, in the conventional example of FIG. 1 and the conventional example of FIG. 2, there is a problem that a high power factor cannot be realized with a heavy load.

In the conventional example of FIG. 3, there is a problem that the smoothing capacitor C1 has large voltage stress.

SUMMARY OF THE INVENTION

It is an object of this invention to provide an AC/DC switching power supply that solves the above-described problems and has small voltage stress on the smoothing capacitor C1 at a high power factor.

It is another object of this invention to provide a switching power supply that has small voltage stress on a switch and that is suitable for low loss and miniaturization.

DETAILED DESCRIPTION OF THE PREFERRED EMBODIMENTS

Figure 1:
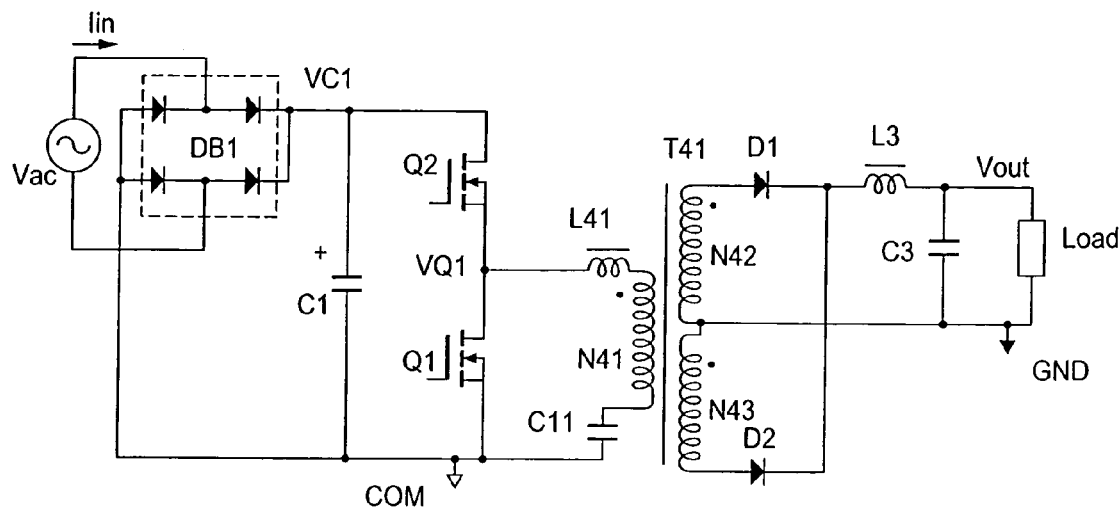
FIG. 1 is a structural view showing a conventional switching power supply.
Figure 2:
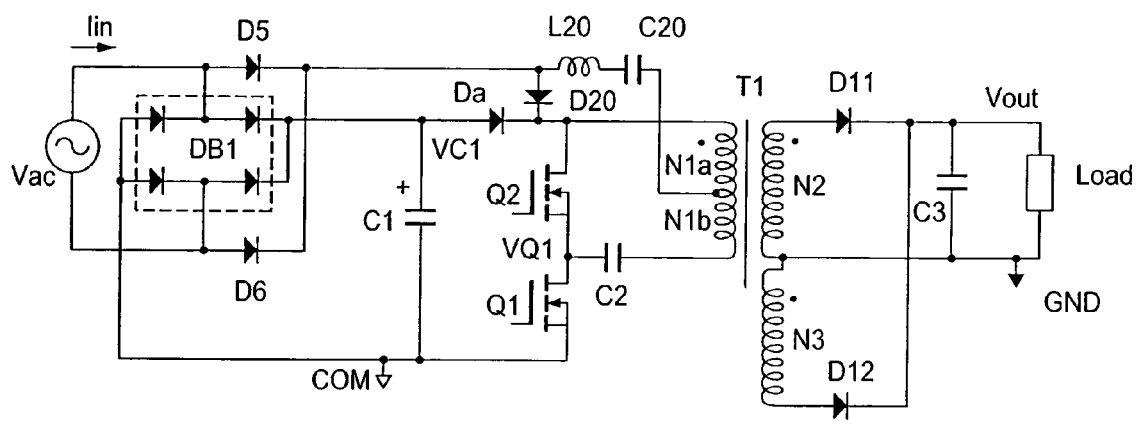
FIG. 2 is a structural view showing another conventional switching power supply.
Figure 3:
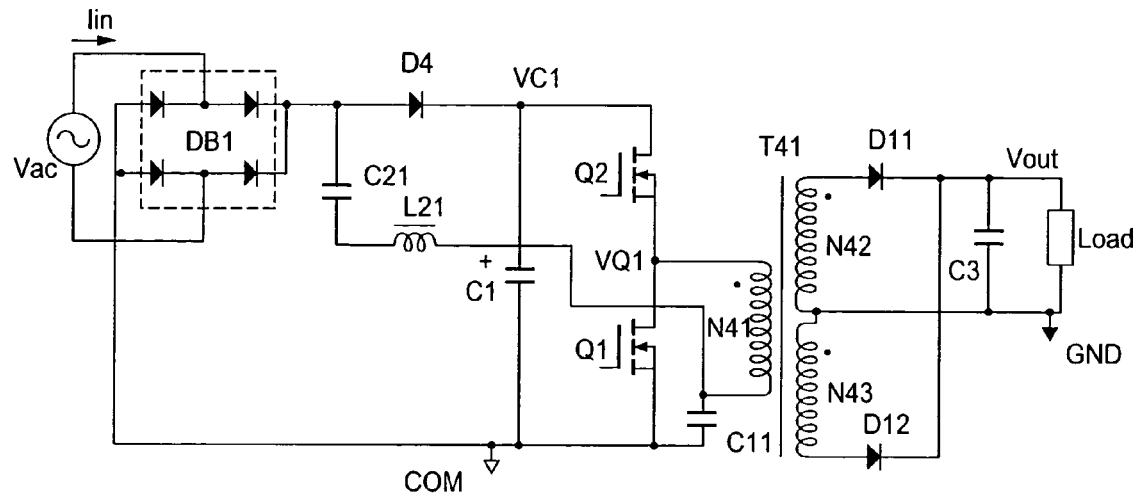
FIG. 3 is a structural view showing still another conventional switching power supply.
Figure 4:
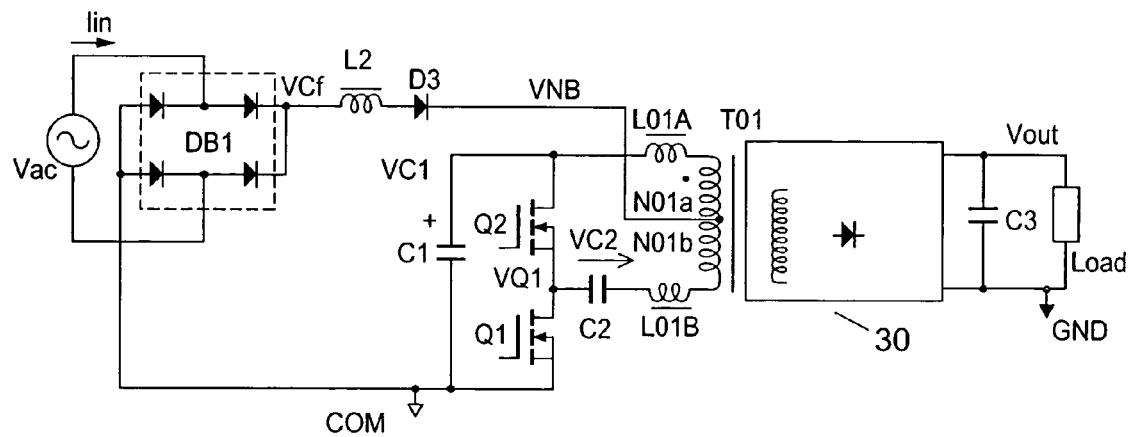
FIG. 4 is a structural view showing en embodiment of this invention.

Hereinafter, this invention will be described in detail with reference to FIG. 4. FIG. 4 is a structural view showing an embodiment of a switching power supply according to this invention. The same elements as those in the conventional examples of FIGS. 1 to 3 are denoted by the same symbols and numerals and will not be described further in detail.

A first characteristic feature of the embodiment of FIG. 4 is that an inductor L2 is provided, which is a first magnetic element.

Specifically, one end of the inductor L2 is connected to an AC voltage Vac via a rectifying circuit DB1.

The other end of the inductor L2 is connected to an intermediate tap of primary windings N01a, N01b of a transformer T01 via a diode D3.

The voltage at the connection point between the inductor L2 and the rectifying circuit DB1 is a voltage VCf, which is a positive electrode obtained by rectifying the AC voltage Vac. The voltage at the intermediate tap of the primary windings N01a, N01b is a voltage VNB.

Therefore, the one end of the inductor L2 has the voltage VCf and is connected to the positive electrode obtained by rectifying the AC voltage Vac.

In the case where the arrangement of the inductor L2 and the diode D3 of the embodiment of FIG. 4 is modified in the reverse manner, that is, in the case where the one end of the inductor L2 is connected to the rectifying circuit DB1 via the diode D3, the connection point between the rectifying circuit DB1 and the diode D3, and the inductor L2, becomes the positive electrode obtained by rectifying the AC voltage Vac.

Alternatively, it is also possible to obtain the positive electrode as a result of rectifying the AC voltage Vac, from an output of a diode other than the rectifying circuit DB1. The details of this will be described later in an embodiment shown in FIG. 18.

The intermediate tap of the primary windings N01a, N01b is a connection point between the primary winding N01a and the primary winding N01b and is also a high-frequency AC voltage source.

A second characteristic feature of the embodiment of FIG. 4 is the arrangement of a resonance capacitor C2 and the transformer T01.

Specifically, one end of the resonance capacitor C2 is connected to a connection point between a first switch Q1 and a second switch Q2.

The other end of the resonance capacitor C2 is connected to one end of the primary winding N01b of the transformer T01 via an inductor L01B.

One end of the primary winding N01a of the transformer T01 is connected to a positive electrode of a smoothing capacitor C1 via an inductor L01A.

The other end of the primary winding N01a is connected to the other end of the primary winding N01b.

The voltage at the connection point of the resonance capacitor C2, the first switch Q1 and the second switch Q2 is a voltage VQ1. The voltage at the resonance capacitor C2 is a voltage VC2. The voltage at the smoothing capacitor C1 is a voltage VC1.

The inductor L01A and the inductor L01B may be leakage inductance of the transformer T01. They may also be external elements. Alternatively, the inductor L01A or the inductor L01B may be omitted.

The inductor L2 may be leakage inductance of the transformer T01.

Moreover, in the embodiment of FIG. 4, the smoothing capacitor C1 is connected to the rectifying circuit DB1 via the inductor L2, the diode D3, the transformer T01 and the inductor L01A, and smoothes an output of the rectifying circuit DB1.

The first switch Q1 and the second switch Q2 are connected in series and form a series switch circuit. The series switch circuit is connected directly between the two electrodes of the smoothing capacitor C1.

That is, the positive electrode of the smoothing capacitor C1 is connected with one end (drain) of the second switch Q2, and the negative electrode of the smoothing capacitor C1 is connected with one end (source) of the first switch Q1. The other end (source) of the second switch Q2 is connected with the other end (drain) of the first switch Q1.

As the first switch Q1 is turned on/off and the second switch Q2 is turned on/off in a complementary manner with the first switch Q1, a voltage to be an output is induced at a secondary winding of the transformer T01.

Moreover, an output circuit 30, which includes the secondary winding of the transformer T01 and a rectifying and smoothing circuit, is arranged on the secondary side of the switching power supply. The output circuit 30 is connected with a capacitor C3 and a load Load.

Figure 5A:
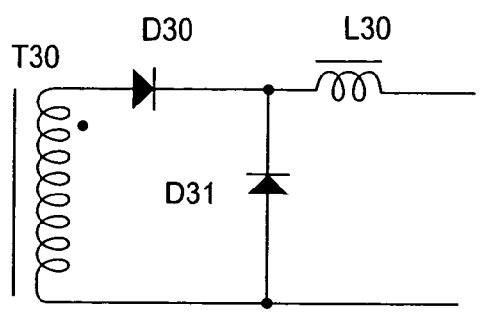
FIGS. 5A to 5H are structural views showing examples of an output circuit.
Figure 5B:
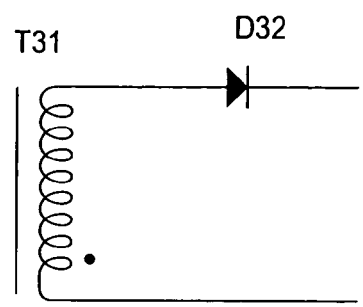
Figure 5C:
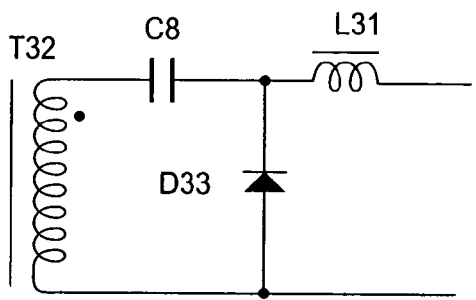
Figure 5D:
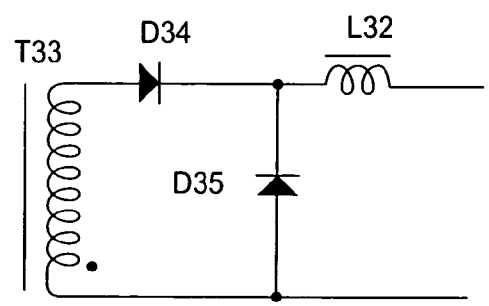
Figure 5E:
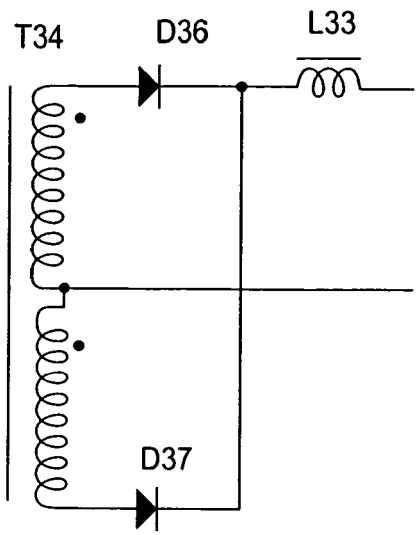
Figure 5F:
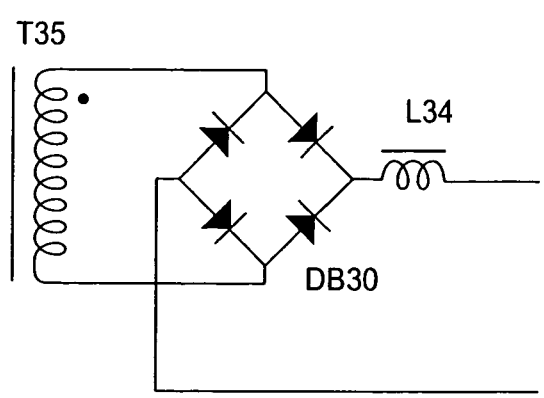
Figure 5G:
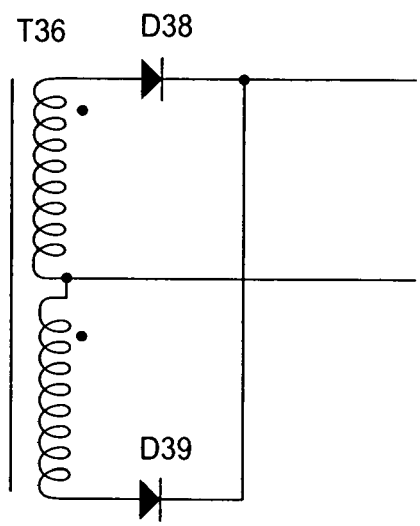
Figure 5H:
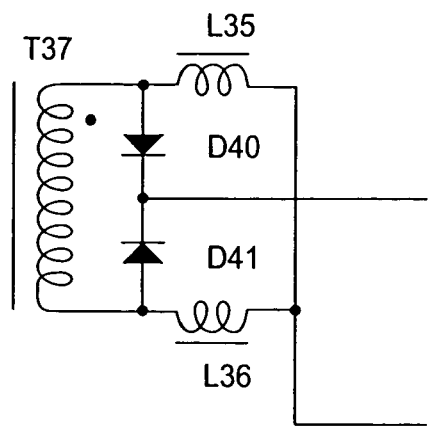

The output circuit 30 will now be described. FIGS. 5A to 5H are structural views showing examples of the output circuit 30. FIG. 5A shows a forward type. FIG. 5B shows a flyback type. FIG. 5C shows a Zeta type. FIG. 5D shows a fly-forward type. FIG. 5E shows a center tapped type. FIG. 5F shows a bridge type. FIG. 5G shows an inductanceless center tapped type. FIG. 5H shows a current doubler type. It is also possible to make modifications by combining these types.

The output circuit 30 rectifies and smoothes the voltage induced at the secondary winding of the transformer T01, and generates an output voltage Vout to supply power to the load Load.

Figure 6:
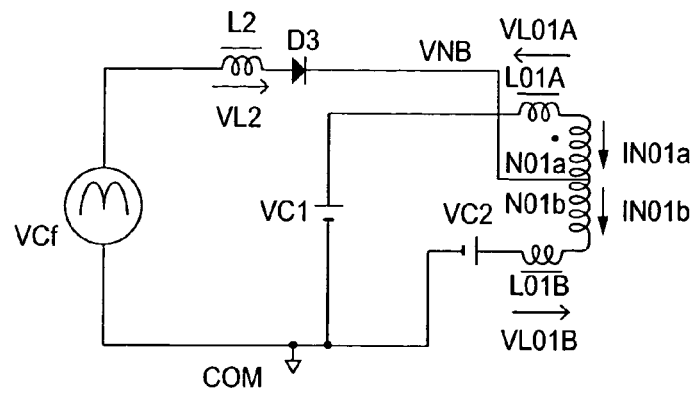
FIG. 6 shows an equivalent circuit in the case where a first switch Q1 is on and a second switch Q2 is off in the embodiment of FIG. 4.

The properties of this embodiment of FIG. 4 will now be described with reference to FIG. 6. FIG. 6 shows an equivalent circuit in the case where the first switch Q1 is on and the second switch Q2 is off in the embodiment of FIG. 4. The same elements as those in the embodiment of FIG. 4 are denoted by the same symbols and numerals and will not be described further in detail.

In the equivalent circuit of FIG. 6, the voltage VCf becomes a voltage source VCf. The smoothing capacitor C1 becomes a DC voltage source VC1. The capacitor C2 becomes a DC voltage source VC2. The first switch Q1 is short-circuited. The second switch Q2 is open.

In this case, the inductor L2 is magnetically excited by a circuit formed by the diode D3, the primary winding N01$b$, the inductor L01B, the DC voltage source VC2 (capacitor C2) and the voltage source VCf (AC voltage Vac and rectifying circuit DB1), and a circuit formed by the diode D3, the primary winding N01$a$, the inductor L01A, the DC voltage source VC1 (smoothing capacitor C1) and the voltage source VCf (AC voltage Vac and rectifying circuit DB1).

The DC voltage source VC2 (smoothing capacitor C2) has the polarity that restrains the magnetic excitation of the inductor L2.

When the first switch Q1 is off and the second switch Q2 is on (not shown), the energy accumulated by the magnetic excitation of the inductor L2 is discharged in the circuit formed by the diode D3, the primary winding N01$a$, the inductor L01A, the smoothing capacitor C1 (DC voltage source VC1) and the voltage source VCf (AC voltage Vac and rectifying circuit DB1) and charges the smoothing capacitor C1.

Therefore, by restraining the magnetic excitation of the inductor L2, it is possible to restrain the voltage stress on the smoothing capacitor C1. In the embodiment of FIG. 4, the voltage stress on the smoothing capacitor C1 is restrained by the capacitor C2 (DC voltage source VC2).

Specifically, in the equivalent circuit of FIG. 6, a voltage VL2 applied to the inductor L2 is expressed by the following equation:

$$VL2=VCf-\{N01b/(N01a+N01b)*(VC1-VL01A)+N01a/$$

$$(N01a+N01b)*(VC2+VL01B)\} \quad (1)$$

Figure 7:
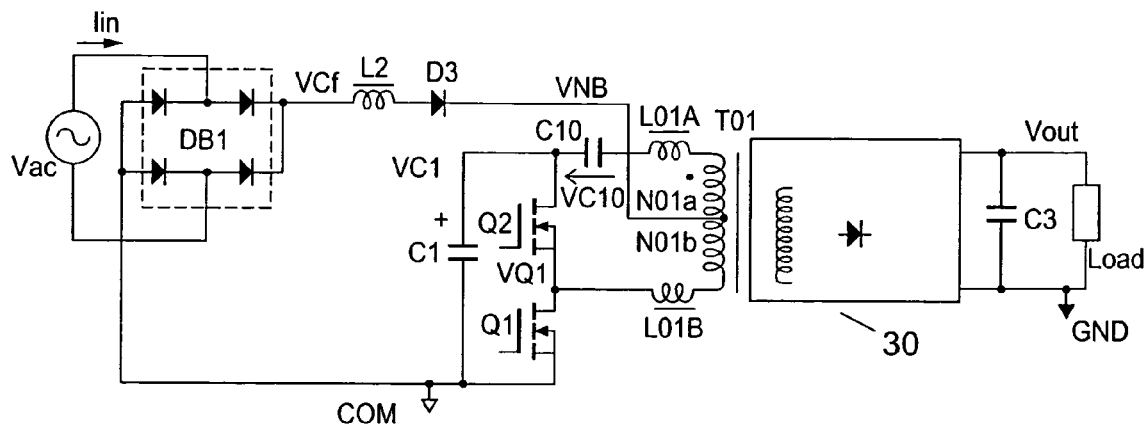
FIG. 7 is a structural view showing a reference example for explaining an effect of the embodiment of FIG. 4.

The above-described effect will now be described with reference to FIG. 7. FIG. 7 is a structural view showing a reference example for explaining the effect of the embodiment of FIG. 4. The same elements as those in the embodiment of FIG. 4 are denoted by the same symbols and numerals and will not be described further in detail.

A characteristic feature of the reference example of FIG. 7 is that the arrangement of a resonance capacitor C10 and a transformer T01 is different.

Specifically, one end of the resonance capacitor C10 is connected to the positive electrode of a smoothing capacitor C1 and one end of a second switch Q2.

The other end of the resonance capacitor C10 is connected to one end of a primary winding N01$a$ of the transformer T01 via an inductor L01A.

One end of a primary winding N01$b$ of the transformer T01 is connected to a connection point between a first switch Q1 and the second switch Q2 via an inductor L01B.

The other end of the primary winding N01$a$ is connected to the other end of the primary winding N01$b$ and a diode D3.

Figure 8:
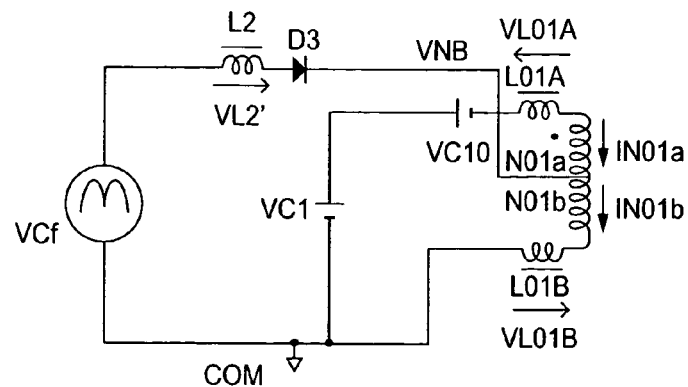
FIG. 8 shows an equivalent circuit in the case where a first switch Q1 is on and a second switch Q2 is off in the reference example of FIG. 7.

The properties of this reference example of FIG. 7 will now be described with reference to FIG. 8. FIG. 8 show an equivalent circuit in the case where the first switch Q1 is on and the second switch Q2 is off in the example of FIG. 7. The same elements as those in the example of FIG. 7 and the equivalent circuit of FIG. 6 are denoted by the same numerals and will not be described further in detail.

In this case, the inductor L2 is magnetically excited by a circuit formed by the diode D3, the primary winding N01$b$, the inductor L01B and the voltage source VCf (AC voltage Vac and rectifying circuit DB1), and a circuit formed by the diode D3, the primary winding N01$a$, the inductor L01A, the DC voltage source VC1 (smoothing capacitor C1) and the voltage source VCf (AC voltage Vac and rectifying circuit DB1).

The DC voltage source VC2 (smoothing capacitor C2) does not have the polarity that restrains the magnetic excitation of the inductor L2.

Specifically, in the equivalent circuit of FIG. 8, a voltage VL2' applied to the inductor L2 is expressed by the following equation:

$$VL2'=VCf-\{N01b/(N01a+N01b)*$$
$$(VC1-VC10-VL01A)+N01a/(N01a+N01b)$$
$$*VL01B\} \quad (2)$$

Therefore, voltage VL2<voltage VL2' holds and the degree of magnetic excitation of the inductor L2 in the reference example of FIG. 7 is larger than the degree of magnetic excitation of the inductor L2 in the embodiment of FIG. 4.

Therefore, the voltage stress on the smoothing capacitor C1 in the reference example of FIG. 7 is larger than the voltage stress on the smoothing capacitor C1 in the embodiment of FIG. 4.

Such difference between the properties of the embodiment of FIG. 4 and the properties of the reference example of FIG. 7 is caused by the inductor L2 (first magnetic element) connected between the positive electrode obtained by rectifying the AC voltage and the intermediate tap of the primary windings of the transformer T01.

It is an unexpected characteristic proper to the AC/DC switching power supply.

For example, with respect to the conventional example of FIG. 1 (where one end of the resonance capacitor C11 is connected to the negative electrode of the smoothing capacitor C1 and one end (source) of the first switch Q1, and one end of the primary winding N41 is connected to the connection point between the first switch Q1 and the second switch Q2, and the other end of the resonance capacitor C11 is connected to the other end of the primary winding N41), and a modification of the conventional example of FIG. 1 where one end of the resonance capacitor C11 is connected to the connection point between the first switch Q1 and the second switch Q2, and one end of the primary winding N41 is connected to the negative electrode of the smoothing capacitor C1, and the other end of the resonance capacitor C11 is connected to the other end of the primary winding N41 (not shown), the circuit structures are equivalent and their properties are the same.

Figure 9:
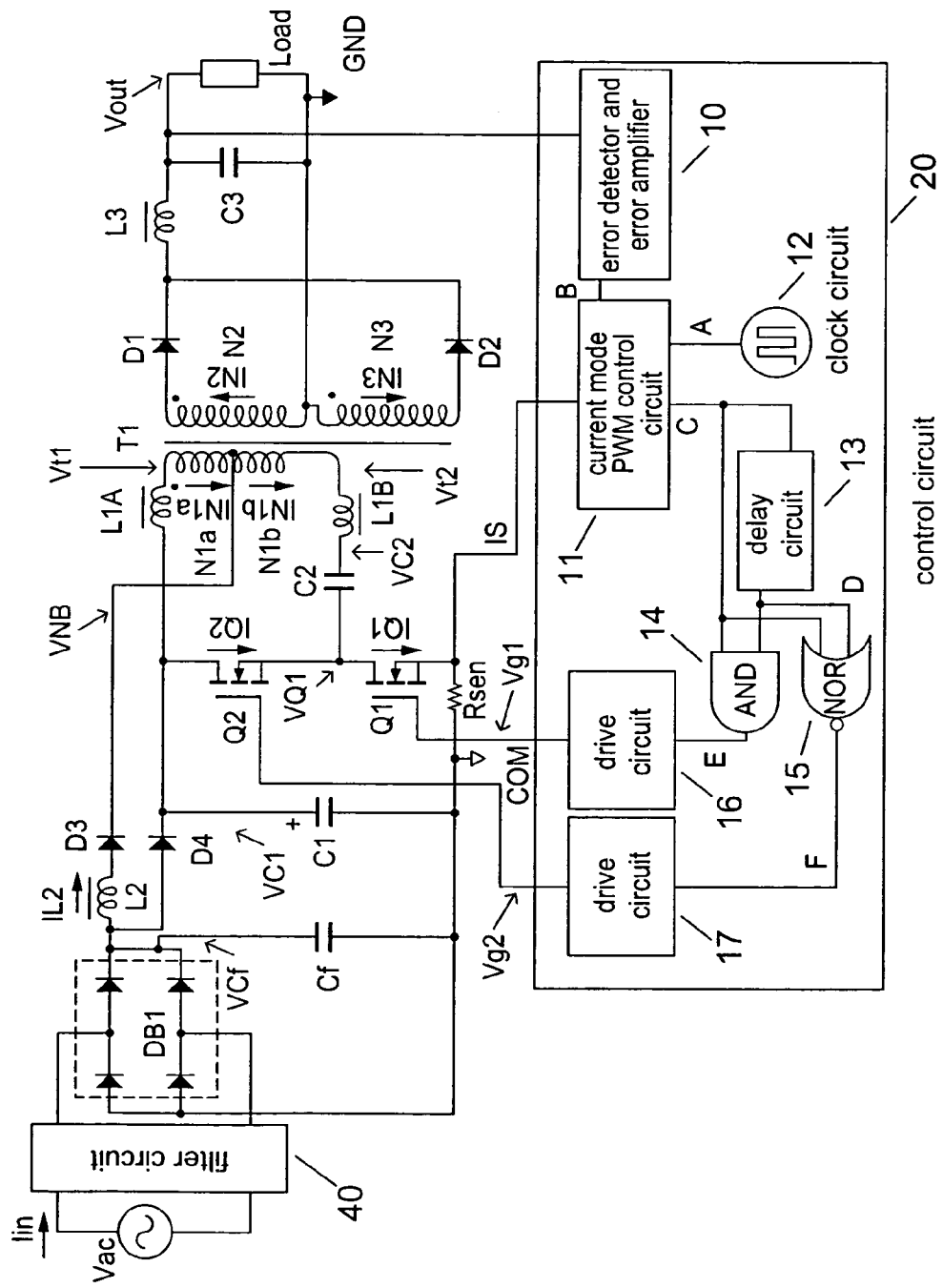
FIG. 9 is a structural view showing a second embodiment of this invention.

FIG. 9 is a structural view showing a second embodiment of the switching power supply according to this invention. The same elements as those shown in FIG. 4 are denoted by the same symbols and numerals and will not be described further in detail. The embodiment of FIG. 9 is a more specific example of the embodiment of FIG. 4.

The structure of the embodiment of FIG. 9 will now be described.

A filter circuit 40 is provided between an AC voltage Vac and a rectifying circuit DB1. A capacitor Cf is provided at an output of the rectifying circuit DB1. Moreover, a blocking diode D4 is provided which connects the rectifying circuit DB1 with a smoothing capacitor C1. A resistor Rsen is provided between one end (source terminal) of a first switch Q1, and the negative electrode of the smoothing capacitor C1 and a common potential COM.

The blocking diode D4 has its anode connected to a positive electrode obtained from the rectifying circuit DB1 and has its cathode connected to the positive electrode of the smoothing capacitor C1.

A control circuit 20 inputs an output voltage Vout and a voltage IS generated at the resistor Rsen and outputs a driving signal Vg1 for the first main switch Q1 and a driving signal (Vg2–VQ1) for a second main switch Q2.

The driving signal Vg1 is applied between the gate and source of the first main switch Q1. The driving signal (Vg2–VQ1) is applied between the gate and source of the second main switch Q2.

The internal structure of this control circuit 20 will now be described.

The output voltage Vout is inputted to an error detector and error amplifier 10. A signal B outputted from the error detector and error amplifier 10, the signal IS of the voltage generated at the resistor Rsen and a signal A outputted from a clock circuit 12 are inputted to a current mode PWM control circuit 11.

A signal C outputted from the current mode PWM control circuit 11 is inputted to a delay circuit 13, an AND circuit 14 and a NOR circuit 15. A signal D outputted from the delay circuit 13 is inputted to the AND circuit 14 and the NOR circuit 15.

A signal E outputted from the AND circuit 14 is inputted to a drive circuit 16. A signal F outputted from the NOR circuit 15 is inputted to a drive circuit 17. The drive circuit 16 outputs the driving signal Vg1. The drive circuit 17 outputs the driving signal (Vg2–VQ1).

Therefore, the driving signal Vg1 and the driving signal (Vg2–VQ1) are complementary, and the first main switch Q1 and the second main switch Q2 are turned on/off in a complementary manner.

The first main switch Q1 and the second main switch Q2 are turned on/off in a complementary manner via a period when both of these switches are off. This is described in detail in Japanese Patent Application No. 2003-014284, etc. and therefore will not be described further in detail.

An inductor L1A, an inductor L1B, a primary winding N1$a$ and a primary winding N1$b$ in the embodiment of FIG. 9 are equivalent to the inductor L01A, the inductor L01B, the primary winding N01$a$ and the primary winding N01$b$ in the embodiment of FIG. 4, respectively, and have similar structures.

A secondary winding N2 and a secondary winding N3 of a transformer T1, are connected to a diode D1 and a diode D2, then connected to an inductor L3 and a capacitor C3 and then connected to a load Load, similarly to the secondary winding N42 and the secondary winding N43 of the transformer T41 in the conventional example of FIG. 1.

Figure 11:
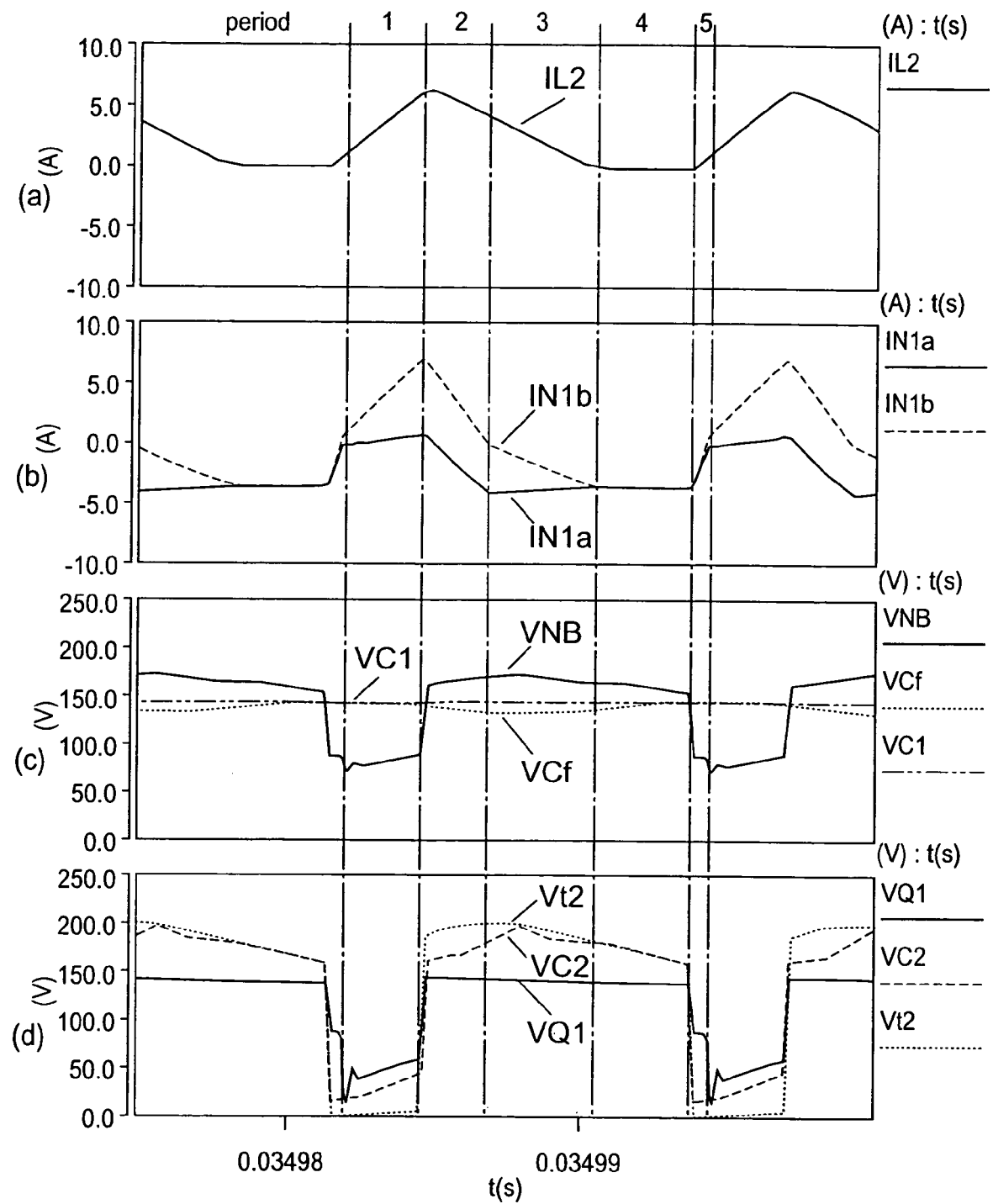
FIG. 11 shows an operating waveform of each part in the embodiment of FIG. 9.
Figure 12:
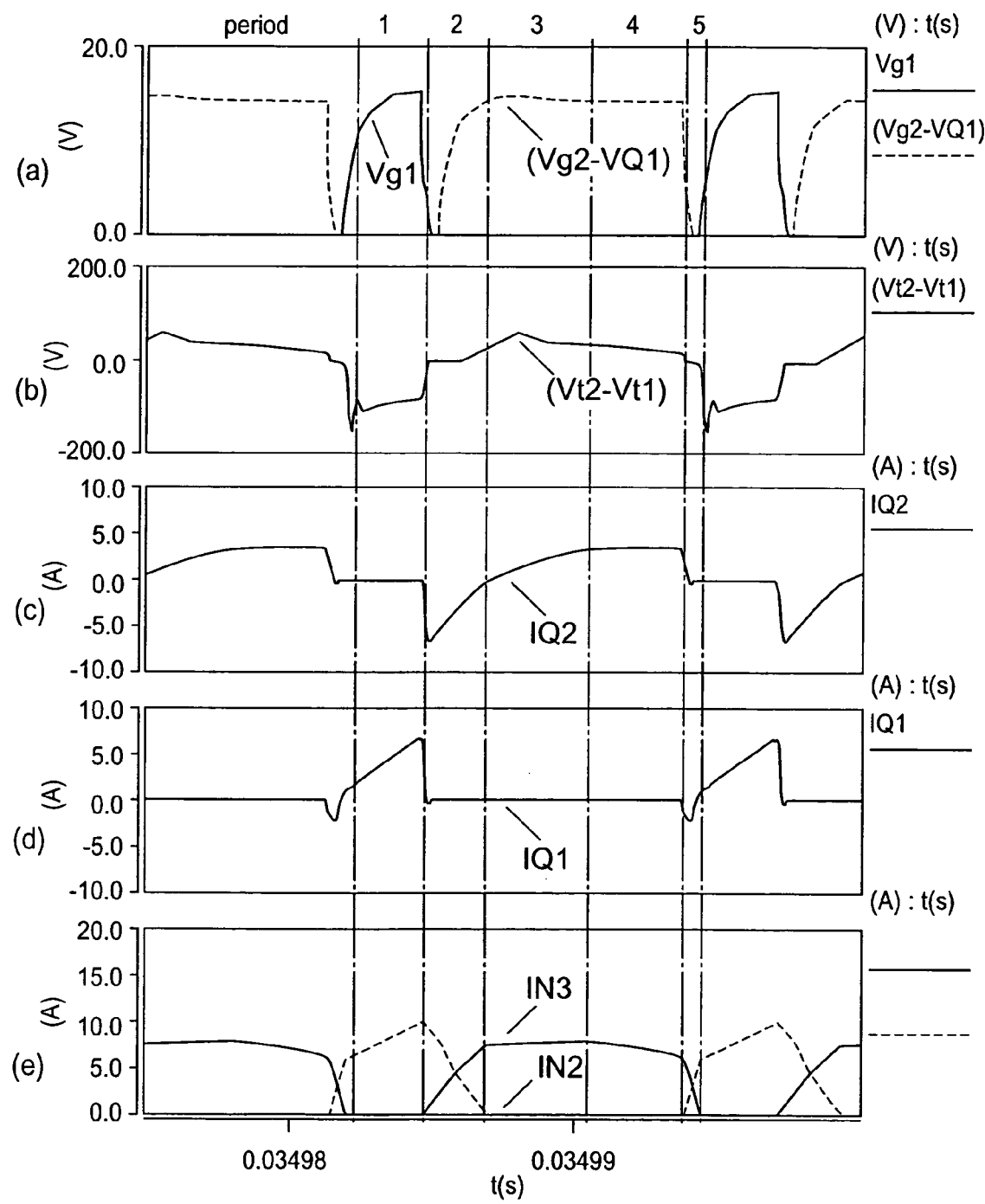
FIG. 12 shows an operating waveform of each part in the embodiment of FIG. 9.

Operations in the frequency region with respect to turning on/off of the first switch Q1 and the second switch Q2 in this embodiment of FIG. 9 will now be described with reference to FIGS. 10A–10E to FIG. 12. FIGS. 10A to 10E are schematic diagrams showing operations during individual periods in the embodiment of FIG. 9. In FIGS. 10A to 10E, the operating state sequentially shifts from a period 1 to a period 5 and again to the period 1. This operation is repeated. FIGS. 11 and 12 show operating waveforms of the individual parts in the embodiment of FIG. 9.

In (a) of FIG. 11, a current IL2 is a current of an inductor L2. As seen from FIG. 11, the current IL2 is discontinuous. That is, the switching power supply operates in an inductor current discontinuous mode (DCM).

In (b) of FIG. 11, a current IN1$a$ is a current of the primary winding N1$a$, and a current IN1$b$ is a current of the primary winding N1$b$.

As seen from FIG. 11, since the current IL2 gently changes, a diode D3 is in a soft switching operation and no recovery or surge occurs. Therefore, low noise and low loss are realized.

In (c) of FIG. 11, a voltage VNB is a voltage at a connection point of the primary winding N1$a$, the primary winding N1$b$ and the diode D3. A voltage VCf is a voltage at a connection point of the rectifying circuit DB1, the inductor L2 and the blocking diode D4. A voltage VC1 is a voltage at the smoothing capacitor C1.

As seen from FIG. 11, the voltage VNB is a high-frequency AC voltage source.

In (d) of FIG. 11, a voltage VQ1 is a voltage at a connection point of the first switch Q1, the second switch Q2 and a resonance capacitor C2. A voltage VC2 is a voltage at a connection point between the resonance capacitor C2 and the inductor L1B. A voltage Vt2 is a voltage at a connection point between the inductor L1B and the primary winding N1$b$.

In (a) of FIG. 12, a voltage Vg1 is a driving signal for the first switch Q1, and a voltage (Vg2–VQ1) is a driving signal for the second switch Q2.

In (b) of FIG. 12, a voltage (Vt2–Vt1) is the sum of the voltage at the primary winding N1$a$ and the voltage at the primary winding N1$b$.

In (c) of FIG. 12, a current IQ2 is a current at the second switch Q2.

In (d) of FIG. 12, a current IQ1 is a current at the first switch Q1.

In (e) of FIG. 12, a current IN2 is a current at the secondary winding N2, and a current IN3 is a current at the secondary winding N3.

The periods 1 to 7 will now be described in order.

Figure 10A:
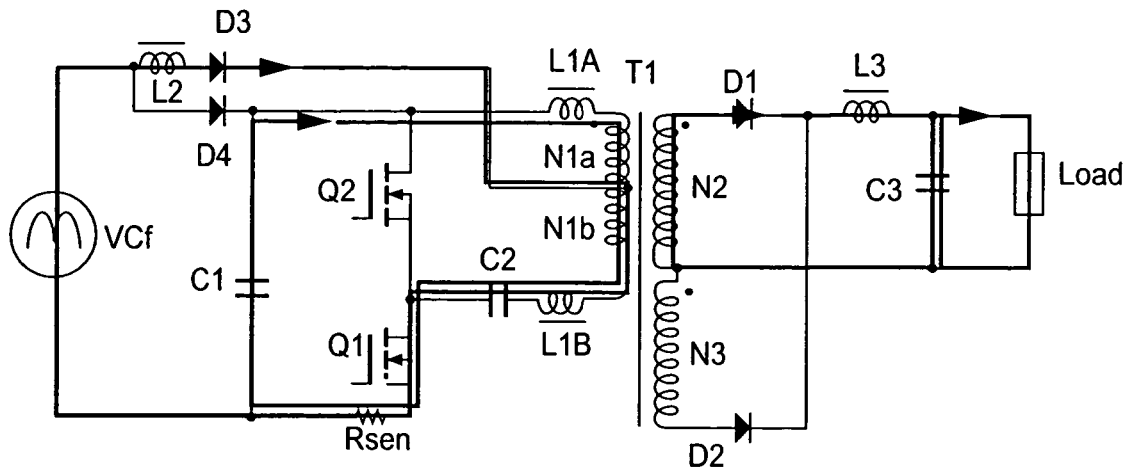
FIGS. 10A to 10E are schematic diagrams showing operations during individual periods in the embodiment of FIG. 9.

In the period 1, an operation as shown in FIG. 10A is performed. The first switch Q1 is on. The second switch Q2 is off. The diode D1 is on. The diode D2 is off. The diode D3 is on.

In this case, the inductor L2, the transformer T1 and the inductor L3 are magnetically excited. Then, as the first switch Q1 is turned off, the period 1 ends and shifts to the period 2.

Figure 10B:
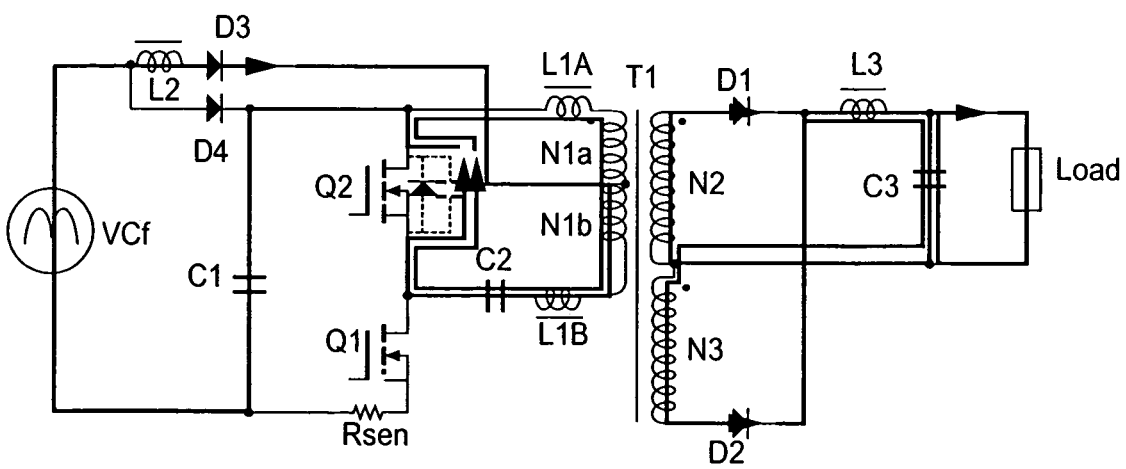

In the period 2, an operation as shown in FIG. 10B is performed. The first switch Q1 is off. The second switch Q2 is turned on as its body diode is biased forward. The diode D1 and the diode D2 are on. The diode D3 is on.

In this case, the current IN1b, a reverse current of the current IQ2 and the current IN2 decrease. The energy accumulated at the inductor L2 charges the smoothing capacitor C1. Then, as the current IN1b, the reverse current IQ2 and the current IN2 become zero, the period 2 ends and shifts to the period 3.

If the driving voltage (Vg2–VQ1) is switched to a high level during the period 2, the second switch Q2 is turned on with low noise and low loss.

Figure 10C:
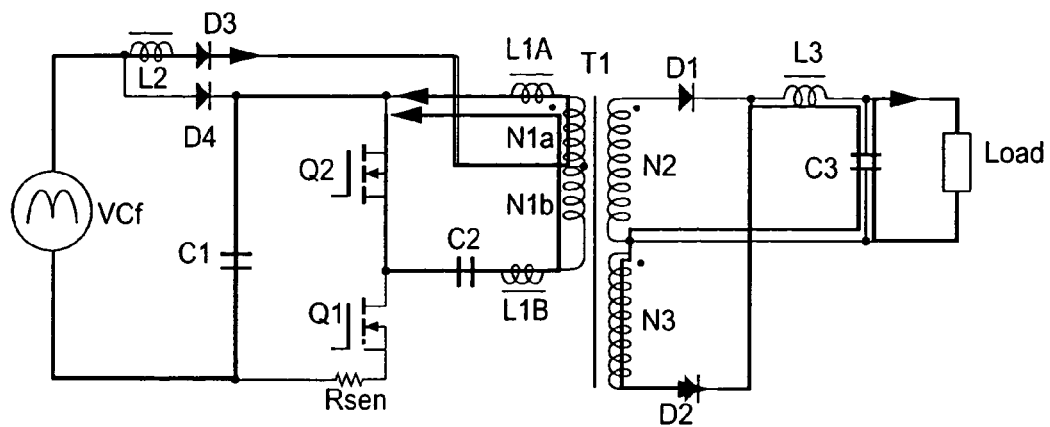

In the period 3, an operation as shown in FIG. 10C is performed. The first switch Q1 is off. The second switch Q2 is on. The diode D1 is off. The diode D2 is on. The diode D3 is on.

In this case, the current IL2 decreases. The energy accumulated at the inductor L2 charges the smoothing capacitor C1. Then, as the current IL2 becomes zero, the period 3 ends and shifts to the period 4.

Figure 10D:
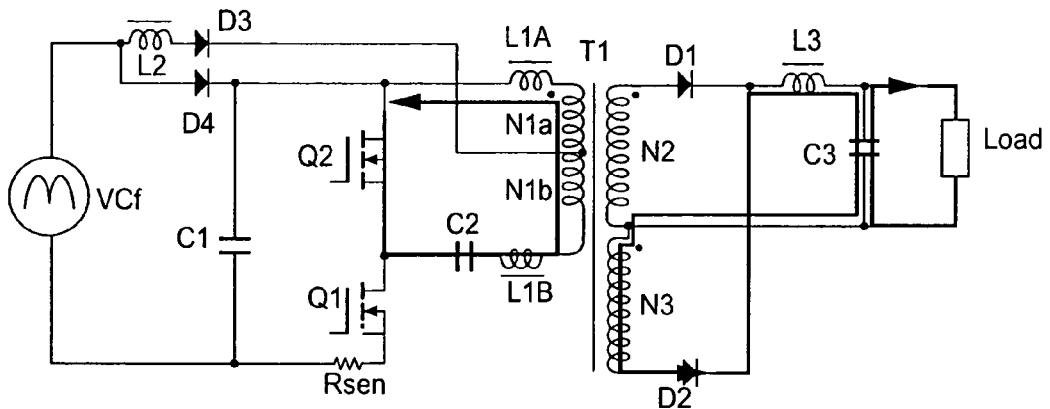

In the period 4, an operation as shown in FIG. 10D is performed. The first switch Q1 is off. The second switch Q2 is on. The diode D1 is off. The diode D2 is on. The diode D3 is off.

In this case, the current IN1b flows from the connection point of the first switch Q1, the second switch Q2 and the resonance capacitor C2 toward the connection point between the resonance capacitor C2 and the inductor L1B (the connection point between the inductor L1B and the primary winding N1b). Then, as the second switch Q2 is turned off, the period 4 ends and shifts to the period 5.

Figure 10E:
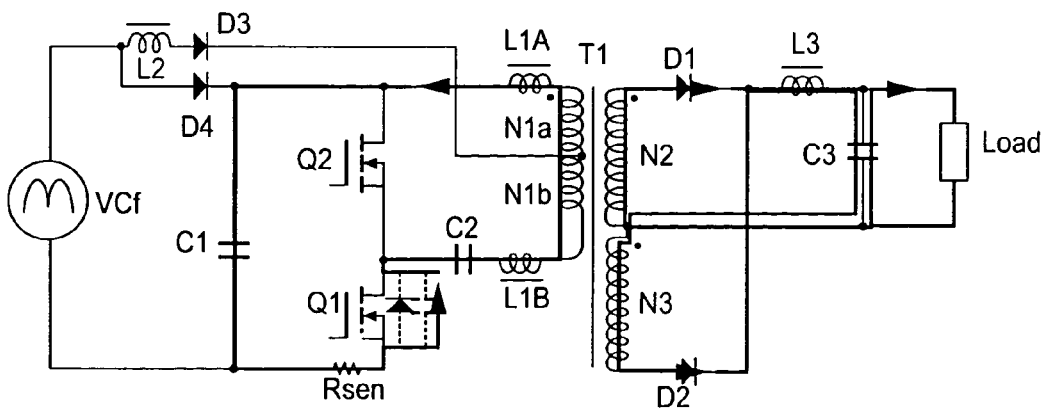

In the period 5, an operation as shown in FIG. 10E is performed. The second switch Q2 is off. The first switch Q1 is turned on as its body diode is biased forward. The diode D1 and the diode D2 are on. The diode D3 is off.

In this case, a reverse current flows through the first switch Q1 and the current IN3 decreases. Then, as the current IN3 becomes zero, the period 5 ends and shifts to the period 1.

If the driving voltage Vg1 is switched to a high level during the period 5, the first switch Q1 is turned on with low noise and low loss.

The voltages induced at the secondary winding N2 and the secondary winding N3 of the transformer T1 are rectified by the diode D1 and the diode D2, then smoothed by the inductor L3 and the capacitor C3, and become the output voltage Vout.

In this manner, in the embodiment of FIG. 9, the AC voltage Vac is converted to the output voltage Vout.

Figure 13:
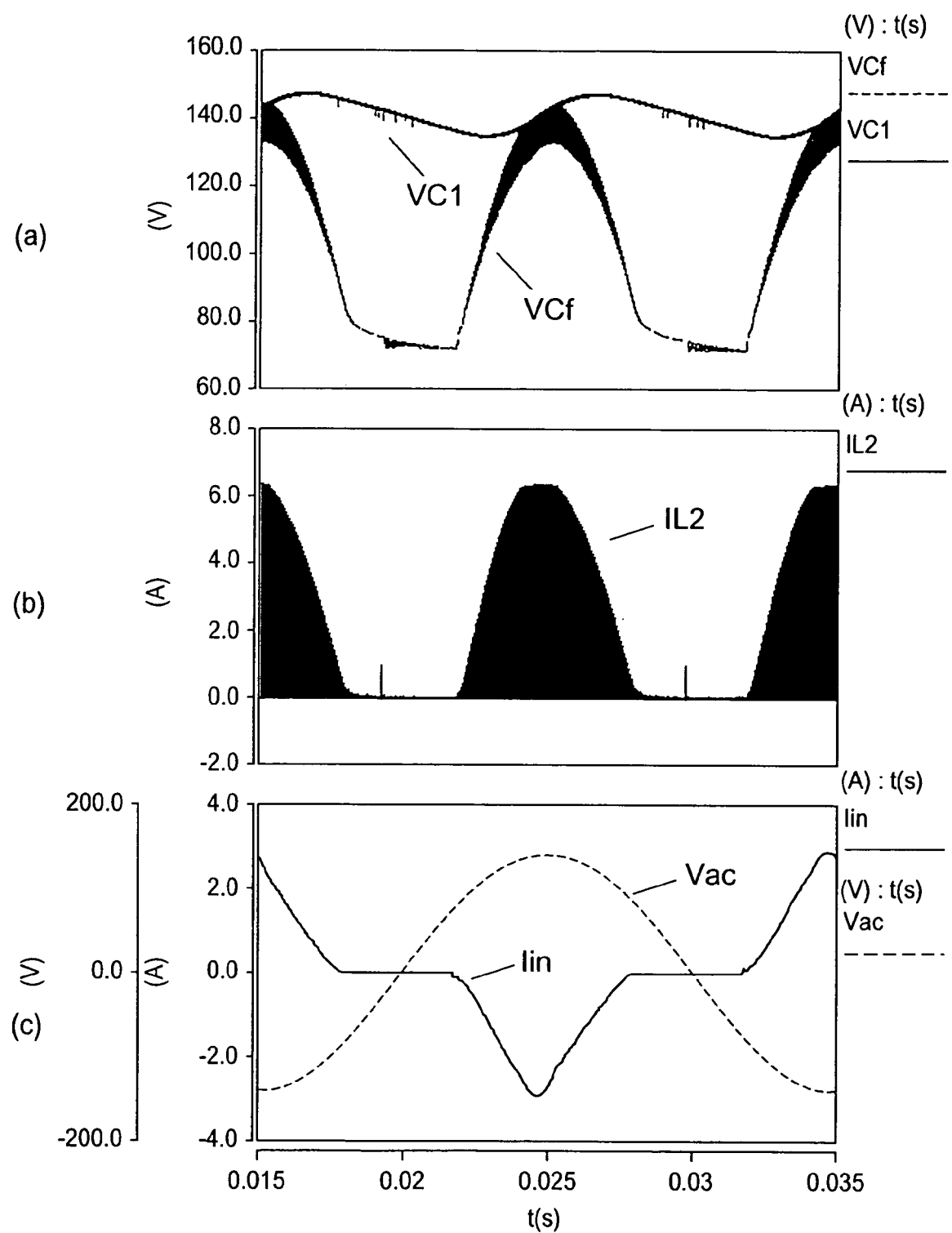
FIG. 13 shows an operating waveform of each part in the embodiment of FIG. 9.

Operations in the frequency region of the AC voltage Vac in the embodiment of FIG. 9 will now be described with reference to FIG. 13. FIG. 13 shows operating waveforms of individual parts in the embodiment of FIG. 9.

In (a) of FIG. 13, a voltage VCf is a voltage at the capacitor Cf, and a voltage VC1 is a voltage at the capacitor C1.

In (b) of FIG. 13, a current IL2 is a current at the inductor L2.

In (c) of FIG. 13, a current Iin is an input current Iin, and a voltage Vac is an AC voltage Vac.

As seen from FIG. 13, in the embodiment of FIG. 9, the waveform of the current Iin enables conversion of power at a high power factor. The current IL2 causes the switching power supply to operate in the inductor current discontinuous mod- (DCM).

The voltage VC1 is not excessively boosted and a preferable property is realized.

In this manner, in the embodiment of FIG. 9, the voltage stress on the smoothing capacitor C1 is small. This is suitable for reduction in loss and miniaturization.

The blocking diode D4 has an effect of facilitating charging of the smoothing capacitor C1 when turning on the switching power supply and at the time of transient changes.

Figure 14:
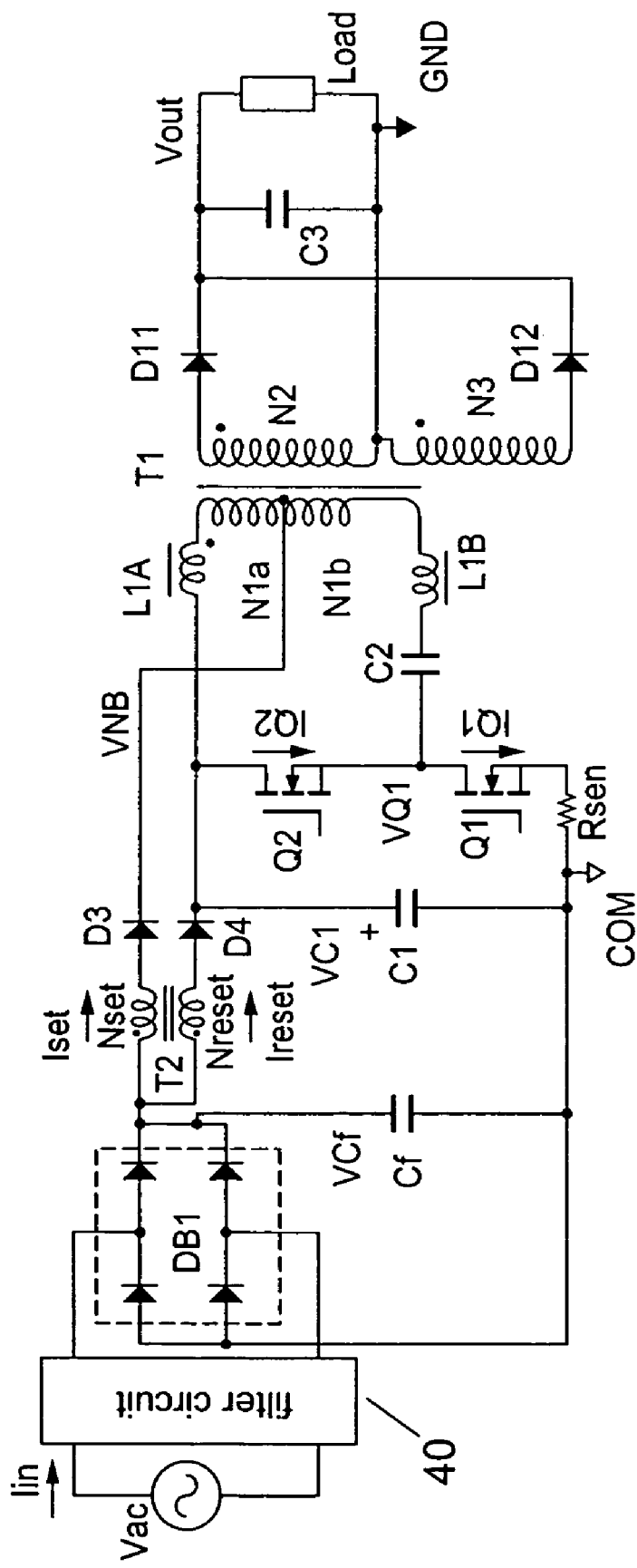
FIG. 14 is a structural view showing a third embodiment of this invention.

FIG. 14 is a structural view showing a third embodiment of the switching power supply according to this invention. The same elements as those shown in FIG. 9 are denoted by the same symbols and numerals and will not be described further in detail.

A characteristic feature of the embodiment of FIG. 14 is that a transformer T2 is provided.

The structure of the transformer T2 will now be described in detail.

Both of one end of a winding Nset of the transformer T2 and one end of a winding Nreset of the transformer T2 are connected to an AC voltage Vac via a rectifying circuit DB1 and a filter circuit 40.

The other end of the winding Nset is connected to an intermediate tap of primary windings N1a, N1b of a transformer T1 via a diode D3.

The other end of the winding Nreset is connected to the positive electrode of a smoothing capacitor C1 via a blocking diode D4.

That is, in the embodiment of FIG. 14, the winding Nset of the transformer T2 is equivalent to a first magnetic element connected between a positive electrode obtained by rectifying the AC voltage Vac and the intermediate tap of the primary windings N1a, N1b.

The winding Nreset of the transformer T2 is equivalent to a second magnetic element connecting the positive electrode obtained from the rectifying circuit DB1 with the positive electrode of the smoothing capacitor C1.

The embodiment of FIG. 14 is equivalent to the case where the winding Nset (first magnetic element) and the winding Nreset (second magnetic element) are magnetically coupled.

Moreover, in the embodiment of FIG. 14, a secondary winding N2 and a secondary winding N3 of the transformer T1 are connected to a diode D11 and a diode D12, respectively, and then connected to a capacitor C3 and a load Load, as in the conventional example of FIG. 2.

As a first switch Q1 is turned on/off and the second switch Q2 is turned on/off in a complementary manner with the first switch Q1, voltages to be an output are induced at the secondary winding N2 and the secondary winding N3 of the transformer T1. The voltages are rectified by the diodes D1 and the diode D12, respectively, then smoothed by the capacitor C3 and become an output voltage Vout to supply power to the load Load.

In this embodiment of FIG. 14, when the winding Nset and the winding Nreset are loosely coupled, preferable properties are shown not only in the inductance current discontinuous mode (DCM) but also in the inductance current continuous mode (CCM). The detailed description of it is given in the U.S. Pat. No. 6,282,103 and therefore will not be described here.

Moreover, since the transformer T2 can accumulate energy, it can reduce the stress on the smoothing capacitor C1. Specifically, the capacitance of the smoothing capacitor C1 can be reduced.

Figure 15:
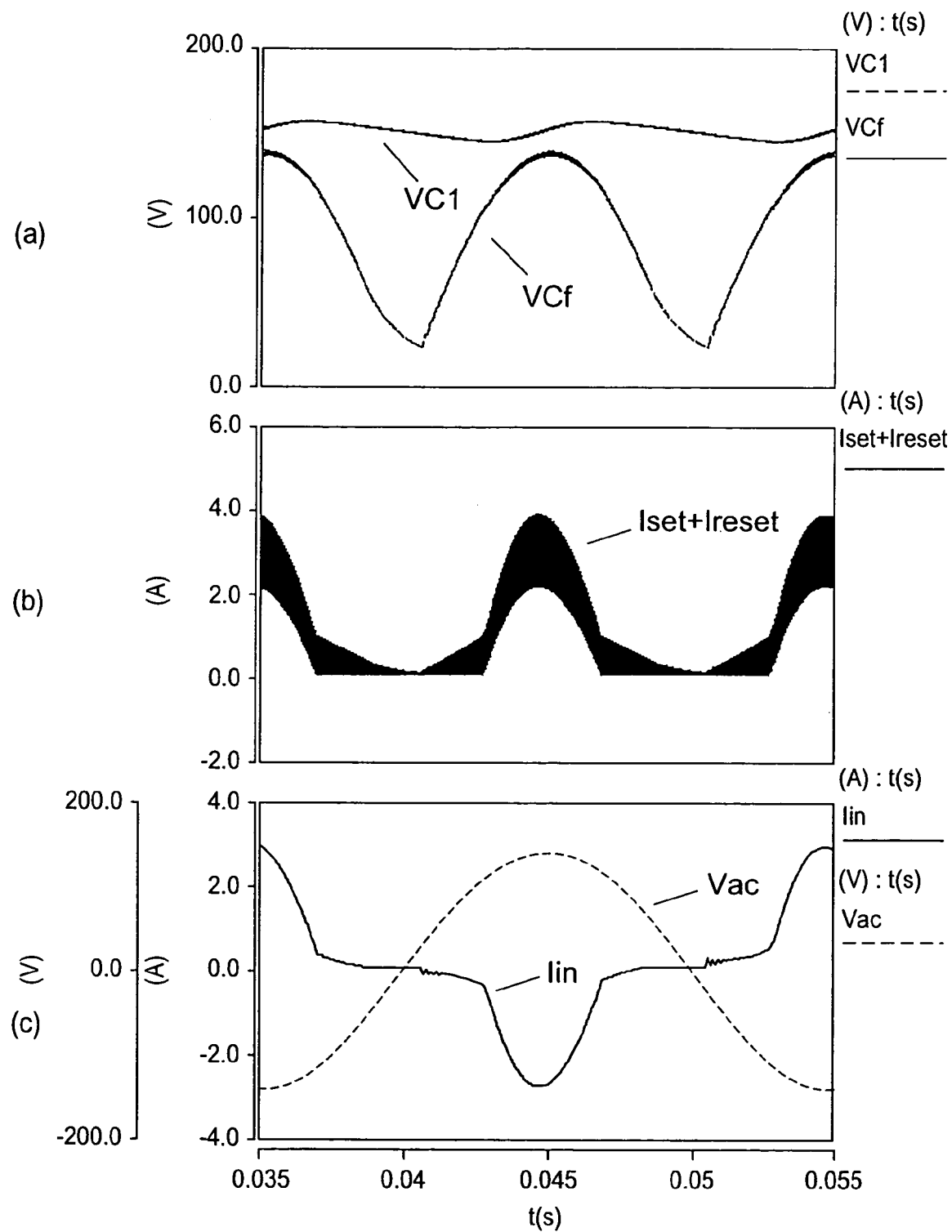
FIG. 15 shows an operating waveform of each part in the embodiment of FIG. 14.

Operations in the frequency region of the AC voltage Vac in this embodiment of FIG. 14 will now be described with reference to FIG. 15. FIG. 15 shows operating waveforms of individual parts in the embodiment of FIG. 14.

In (a) of FIG. 15, a voltage VCf is a voltage at a capacitor Cf, and a voltage VC1 is a voltage at the capacitor C1.

In (b) of FIG. 15, a current (Iset+Ireset) is the sum of a current at the winding Nset of the transformer T2 and a current at the winding Nreset of the transformer T2.

In (c) of FIG. 15, a current Iin is an input voltage Iin, and a voltage Vac is an AC voltage Vac.

As seen from FIG. 15, in the embodiment of FIG. 14, the waveform of the current Iin enables conversion of power at a high power factor. A current IL2 causes the switching power supply to operate in the inductor current continuous mode (CCM).

Since the voltage VC1 is not excessively boosted, the voltage stress on the smoothing capacitor C1 is small. This is suitable for reduction in loss and miniaturization.

In the inductor current continuous mode (CCM), the stress on the filter circuit 40 is small. Therefore, the embodiment of FIG. 14 is suitable for reduction in loss and miniaturization.

Figure 16:
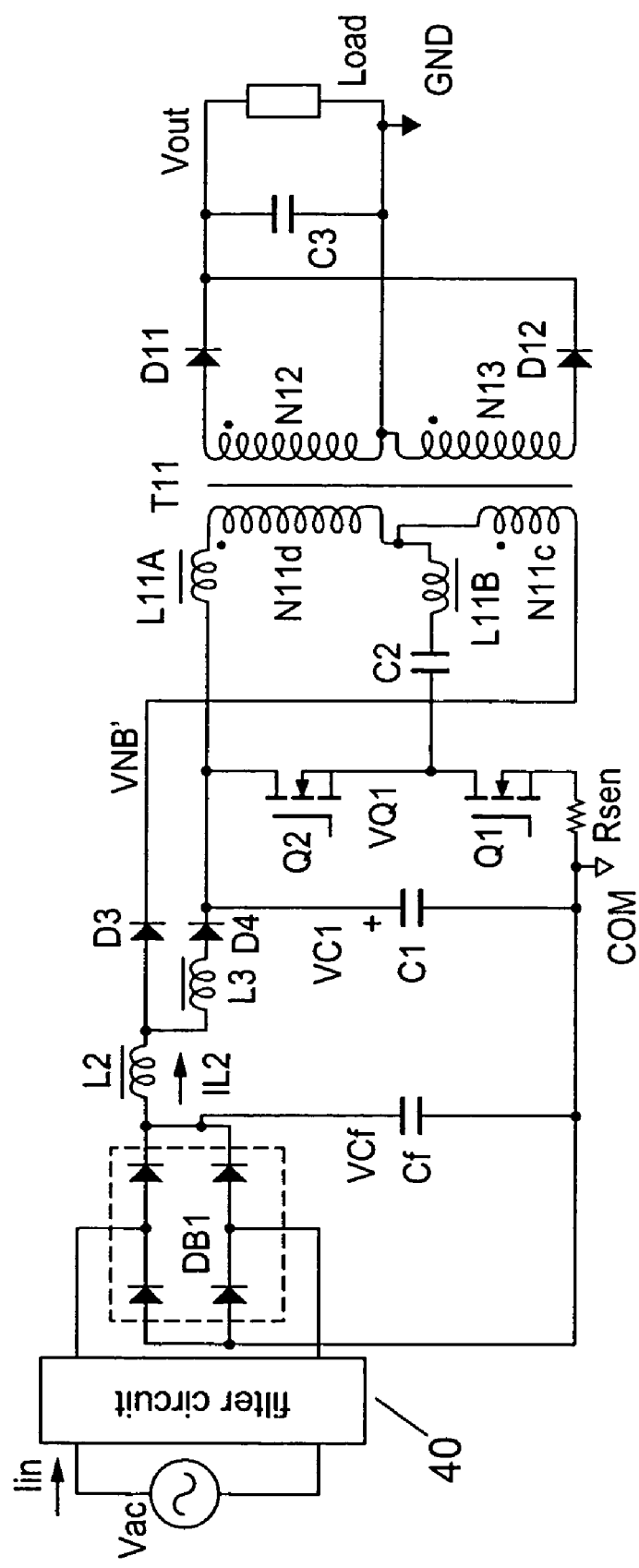
FIG. 16 is a structural view showing a fourth embodiment of this invention.

FIG. 16 is a structural view showing a fourth embodiment of the switching power supply according to this invention. The same elements as those shown in FIG. 9 are denoted by the same symbols and numerals and will not be described further in detail.

A characteristic feature of the embodiment of FIG. 16 is in the structure of a transformer T11.

The structure of the embodiment of FIG. 16 will now be described in detail.

The transformer T11 has an auxiliary winding N11c.

One end of a resonance capacitor C2 is connected to a connection point between a first switch Q1 and a second switch Q2.

One end of a primary winding N11d is connected to the positive electrode of a smoothing capacitor C1 via an inductor L11A.

The other end of the resonance capacitor C2 is connected to the other end of the primary winding N11d and the auxiliary winding N11c via an inductor L11B.

The connection point of the primary winding N11d, the inductor L11B (resonance capacitor C2) and the auxiliary winding N11c is a high-frequency AC voltage source. Also a connection point between a diode D3 and the auxiliary winding N11c is a high-frequency AC voltage source.

The inductor L11A and the inductor L11B may be leakage inductance of the transformer T11, as in the embodiment of FIG. 4. These inductors may also be external elements. Alternatively, the inductor L11A or the inductor L11B may be omitted.

One end of an inductor L2 is connected to an AC voltage Vac via a rectifying circuit DB1 and a filter circuit 40.

The other end of the inductor L2 is connected to the connection point between the primary winding N11d of the transformer T11 and the inductor L11B (resonance capacitor C2) via the diode D3 and the auxiliary winding N11c of the transformer T11.

The other end of the inductor L2 is also connected to the smoothing capacitor C1 via an inductor L3 and a blocking diode D4.

In the embodiment of FIG. 16, the inductor L2 is equivalent to a first magnetic element connected between a positive electrode obtained by rectifying the AC voltage Vac and the connection point of the primary winding N11d, the inductor L11B (resonance capacitor C2) and the auxiliary winding N11c.

The inductor L2 and the inductor L3 are equivalent to a second magnetic element connecting the positive electrode obtained from the rectifying circuit DB1 with the positive electrode of the smoothing capacitor C1.

Moreover, in the embodiment of FIG. 16, a secondary winding N12 and a secondary winding N13 of the transformer T11 are connected to a diode D11 and a diode D12, respectively, and then connected to a capacitor C3 and a load Load, as in the embodiment of FIG. 14.

In this embodiment of FIG. 16, preferable properties are shown not only in the inductance current discontinuous mode (DCM) but also in the inductance current continuous mode (CCM), as in the embodiment of FIG. 14.

Figure 17:
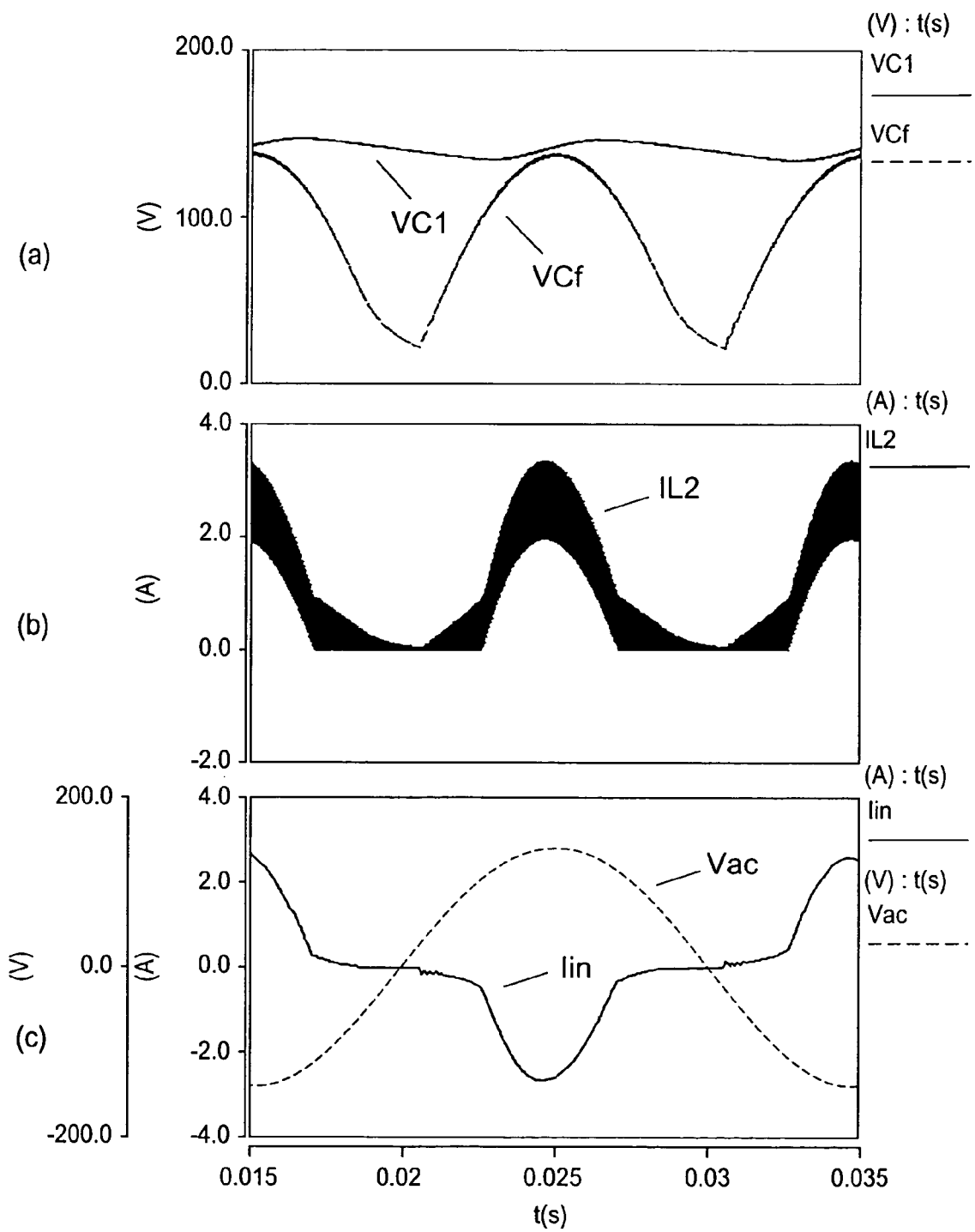
FIG. 17 shows an operating waveform of each part in the embodiment of FIG. 16.

Operations in the frequency region of the AC voltage Vac in this embodiment of FIG. 16 will now be described with reference to FIG. 17. FIG. 17 shows operating waveforms of individual parts in the embodiment of FIG. 16.

In (a) of FIG. 17, a voltage VCf is a voltage at a capacitor Cf, and a voltage VC1 is a voltage at the capacitor C1.

In (b) of FIG. 17, a current IL2 is a current at the inductor L2.

In (c) of FIG. 17, a current Iin is an input voltage Iin, and a voltage Vac is an AC voltage Vac.

As seen from FIG. 17, in the embodiment of FIG. 16, the waveform of the current Iin enables conversion of power at a high power factor. The current IL2 causes the switching power supply to operate in the inductor current continuous mode (CCM).

The voltage VC1 is not excessively boosted and a preferable property is realized.

In the embodiment of FIG. 16, as in the embodiment of FIG. 14, the voltage stress on the smoothing capacitor C1 is small and this is suitable for reduction in loss and miniaturization.

Moreover, in the embodiment of FIG. 16, as in the embodiment of FIG. 14, the stress on the filter circuit 40 can be reduced in the inductor current continuous mode (CCM). In the embodiment of FIG. 16, since the inductor L2 and the inductor L3 can accumulate energy, the capacitance of the smoothing capacitor C1 can be reduced.

Figure 18:
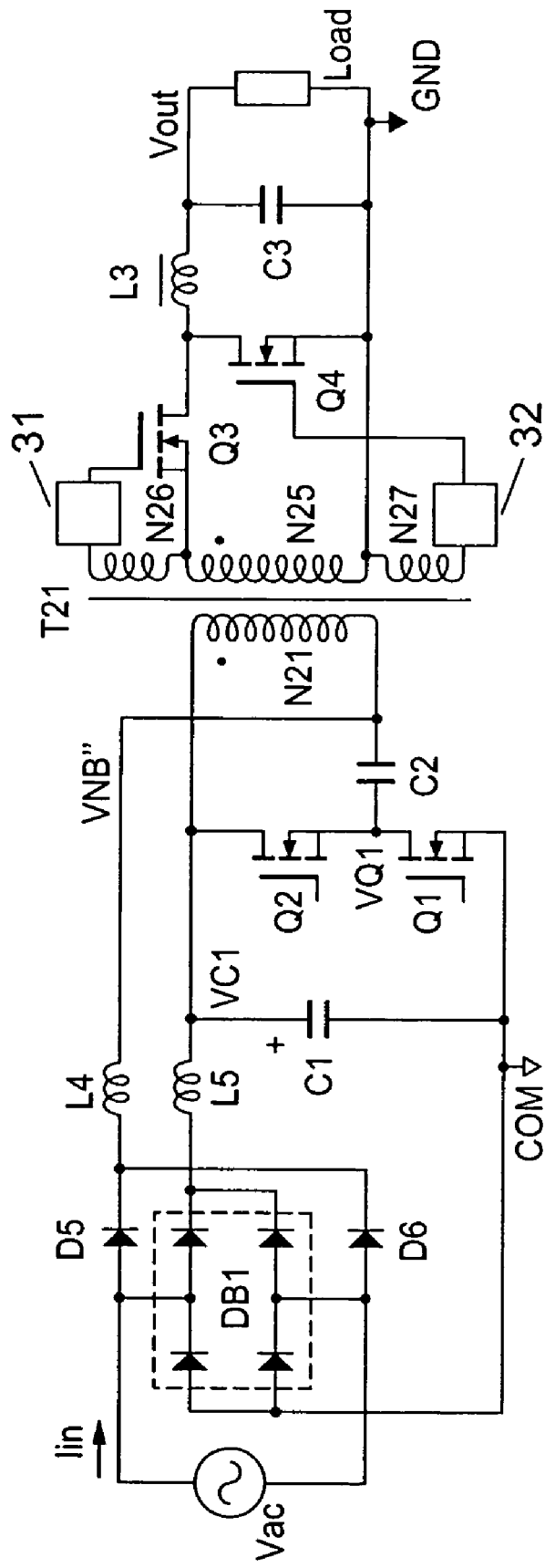
FIG. 18 is a structural view showing a fifth embodiment of this invention.

FIG. 18 is a structural view showing a fifth embodiment of the switching power supply according to this invention. The same elements as those shown in FIG. 9 are denoted by the same symbols and numerals and will not be described further in detail.

A characteristic feature of the embodiment of FIG. 18 is that a diode D5 and a diode D6 are provided.

Specifically, one end of an inductor L4 (first magnetic element) is connected to an AC voltage Vac via the diode D5 and the diode D6.

The connection point of the inductor L4, the diode D5 and the diode D6 is a positive electrode obtained by rectifying the AC voltage Vac.

The other end of the inductor L4 is connected to a connection point between a resonance capacitor C2 and a primary winding N21 of a transformer T21.

The connection point between the resonance capacitor C2 and the primary winding N21 is a high-frequency AC voltage source.

One end of an inductor L5 (second magnetic element) is connected to a positive electrode obtained from a rectifying circuit DB1. The other end of the inductor L5 is connected to the positive electrode of a smoothing capacitor C1.

That is, a diode in the rectifying circuit DB1 in the embodiment of FIG. 18 is substituted for the effect of the blocking diode D4 in the embodiment of FIG. 9.

One end of the resonance capacitor C2 is connected to a connection point between a first switch Q1 and a second switch Q2.

One end of the primary winding N21 of the transformer T231 is connected to the positive electrode of the smoothing capacitor C1.

The other end of the resonance capacitor C2 is connected to the other end of the primary winding N21 and the inductor L4.

Moreover, in the embodiment of FIG. 18, a secondary winding N25 of the transformer T21 is connected to a switch Q3 and a switch Q4, then connected to an inductor L3 and a capacitor C3, and then connected to a load Load.

An auxiliary winding N26 of the transformer T21 is connected to a control terminal (gate) of the switch Q3 via a control circuit 31. An auxiliary winding N27 of the transformer T21 is connected to a control terminal (gate) of the switch Q4 via a control circuit 32.

In this embodiment of FIG. 18, as in the embodiment of FIG. 9 and the embodiment of FIG. 16, the voltage stress on the smoothing capacitor C1 is small and this is suitable for reduction in loss and miniaturization.

Since currents of the diode D5 and the diode D6 do not flow through the rectifying circuit DB1, loss due to forward voltage drop is small and high conversion efficiency is realized.

Moreover, the switch Q3 and the switch Q4 operate as rectifiers with small forward voltage drop. At the auxiliary winding N26 and the auxiliary winding N27, suitable driving signals are generated. Therefore, in the embodiment of FIG. 18, since preferable rectification can be carried out, high conversion efficiency can be realized with little loss.

Figure 19:
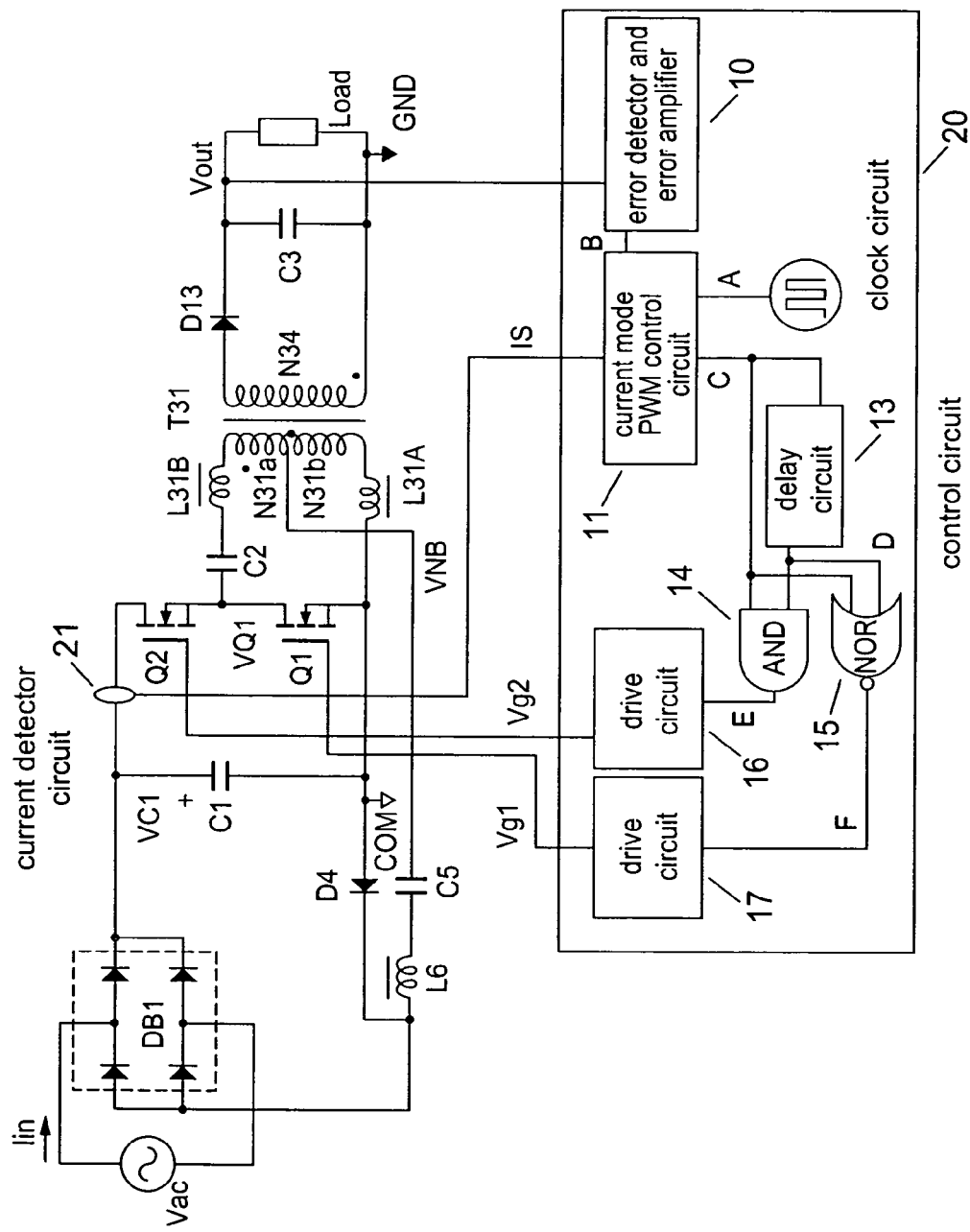
FIG. 19 is a structural view showing a sixth embodiment of this invention.

FIG. 19 is a structural view showing a sixth embodiment of the switching power supply according to this invention. The same elements as those shown in FIG. 9 are denoted by the same symbols and numerals and will not be described further in detail.

A characteristic feature of the embodiment of FIG. 19 is the arrangement of an inductor L6 (first magnetic element) and that a capacitor C5 is provided.

Specifically, the inductor L6 has its one end connected to a rectifying circuit DB1 and has its other end connected to an intermediate tap of primary windings N31a, N31b of a transformer T31 via the capacitor C5.

The voltage at the connection point between the inductor L6 and the rectifying circuit DB1 is a negative electrode obtained by rectifying an AC voltage Vac. The connection point between the primary winding N31a and the primary winding N31b is a high-frequency AC voltage source. Also the connection between the inductor L6 and the capacitor C5 is a high-frequency AC voltage source.

That is, the inductor L6 in the embodiment of FIG. 19 has positive and negative electrodes opposite to those of the inductor L2 in the embodiment of FIG. 9.

One end of a resonance capacitor C2 is connected to a connection point between a first switch Q1 and a second switch Q2.

One end of the primary winding N31b of the transformer T31 is connected to the negative electrode of a smoothing capacitor C1 via an inductor L31A.

The other end of the primary winding N31b is connected to one end of the primary winding N31a of the transformer T31 and the capacitor C5.

The other end of the primary winding N31a is connected to the other end of the capacitor C2 via an inductor L31B.

The inductor L31A and the inductor L31B may be leakage inductance of the transformer T31, like the inductor L1A and the inductor L1B in the embodiment of FIG. 9. These inductors may also be external elements. Alternatively, the inductor L1A or the inductor L1B may be omitted.

The inductor L6 may be leakage inductance of the transformer T31, like the inductor L2 in the embodiment of FIG. 9.

Moreover, a secondary winding N34 of the transformer T31 is connected to a diode D13 and then connected to a capacitor C3 and a load Load.

As the first switch Q1 is turned on/off and the second switch Q2 is turned on/off in a complementary manner with the first switch Q1, a voltage to be an output is induced at the secondary winding N34 of the transformer T31. The voltage is rectified by the diode D13, then smoothed by the capacitor C3 and becomes an output voltage Vout to supply power to the load Load.

Moreover, a current detector circuit 21 is provided between the positive electrode of the smoothing capacitor C1 and the drain of the second switch Q2. The current detector circuit 21 outputs a voltage IS based on a current at the second switch Q2.

In this embodiment of FIG. 19, the voltage stress on the smoothing capacitor C1 is small and this is suitable for reduction in loss and miniaturization, as in the embodiment of FIG. 9.

As can be seen from the above description, according to this invention, an AC/DC switching power supply that realizes a high power factor and has small voltage stress on its smoothing capacitor can be provided.

According to this invention, a switching power supply that has small voltage stress on its switches and is suitable for reduction in loss and miniaturization can be provided.

Moreover, the first switch and the second switch can be turned on with low noise and low loss.

In the case where the switching power supply operates in the inductor current discontinuous mode (DCM) in the embodiment of FIG. 9 and the like, recovery and surge of the diode between the AC voltage and the high-frequency AC voltage source can be restrained. Therefore, low noise and low loss can be realized.

Moreover, in the case where the switching power supply operates in the inductor current continuous mode (CCM) in the embodiment of FIG. 14, the embodiment of FIG. 16, the embodiment of FIG. 18 and the like, the stress on the filter circuit and the stress on the smoothing capacitor can be reduced. Therefore, the switching power supply is suitable for miniaturization.

What is claimed is:

1. A switching power supply comprising a rectifying circuit for rectifying an AC voltage, a smoothing capacitor for smoothing an output of the rectifying circuit, a series switch circuit formed by a first switch and a second switch connected between two electrodes of the smoothing capacitor, a transformer for inducing a voltage to be an output at a secondary winding as the first switch is turned on/off and the second switch is turned on/off in a complementary manner with the first switch, and a series circuit formed by a primary winding of the transformer connected between a connection point of the first switch and the second switch and one terminal of the smoothing capacitor, and a resonance capacitor, wherein a first magnetic element connected between a positive electrode obtained by rectifying the AC voltage and an intermediate tap of the primary winding is provided, the resonance capacitor is connected to the connection point of the first switch and the second switch, and the primary winding is connected to the positive electrode of the smoothing capacitor.

2. The switching power supply as claimed in claim 1, wherein a second magnetic element connecting a positive electrode obtained from the rectifying circuit and the smoothing capacitor is provided.

3. A switching power supply comprising a rectifying circuit for rectifying an AC voltage, a smoothing capacitor for smoothing an output of the rectifying circuit, a series switch circuit formed by a first switch and a second switch connected between two electrodes of the smoothing capacitor, a transformer for inducing a voltage to be an output at a secondary winding as the first switch is turned on/off and the second switch is turned on/off in a complementary manner with the first switch, and a series circuit formed by a primary winding of the transformer connected between a connection point of the first switch and the second switch and one terminal of the smoothing capacitor, and a resonance capacitor, wherein a first magnetic element connected between a positive electrode obtained by rectifying the AC voltage and a connection point of the primary winding and the resonance capacitor is provided, the resonance capacitor is connected to the connection point of the first switch and the second switch, and the primary winding is connected to the positive electrode of the smoothing capacitor.

4. A switching power supply comprising a rectifying circuit for rectifying an AC voltage, a smoothing capacitor for smoothing an output of the rectifying circuit, a series switch circuit formed by a first switch and a second switch connected between two electrodes of the smoothing capacitor, a transformer for inducing a voltage to be an output at a secondary winding as the first switch is turned on/off and the second switch is turned on/off in a complementary manner with the first switch, and a series circuit formed by a primary winding of the transformer connected between a connection point of the first switch and the second switch and one terminal of the smoothing capacitor, and a resonance capacitor, wherein a first magnetic element connected between a positive electrode obtained by rectifying the AC voltage and a high-frequency AC voltage source in the switching power supply is provided, the resonance capacitor is connected to the connection point of the first switch and the second switch, and the primary winding is connected to the positive electrode of the smoothing capacitor.

5. A switching power supply comprising a rectifying circuit for rectifying an AC voltage, a smoothing capacitor for smoothing an output of the rectifying circuit, a series switch circuit formed by a first switch and a second switch connected between two electrodes of the smoothing capacitor, a transformer for inducing a voltage to be an output at a secondary winding as the first switch is turned on/off and the second switch is turned on/off in a complementary manner with the first switch, and a series circuit formed by a primary winding of the transformer connected between a connection point of the first switch and the second switch and one terminal of the smoothing capacitor, and a resonance capacitor, wherein a first magnetic element connected between a high-frequency AC voltage source in the switching power supply and a negative electrode obtained by rectifying the AC voltage is provided, the resonance capacitor is connected to the connection point of the first switch and the second switch, and the primary winding is connected to the negative electrode of the smoothing capacitor.

* * * * *